March 13, 1956 — O. G. DOUGLAS — 2,738,048
VARIABLE SPEED CONTROL HYDRAULIC CLUTCH OR COUPLING
Filed Dec. 14, 1954 — 4 Sheets-Sheet 1

OLLIE G. DOUGLAS
INVENTOR

BY McMorrow, Berman & Davidson
ATTORNEYS

March 13, 1956  O. G. DOUGLAS  2,738,048
VARIABLE SPEED CONTROL HYDRAULIC CLUTCH OR COUPLING
Filed Dec. 14, 1954  4 Sheets-Sheet 2

OLLIE G. DOUGLAS
INVENTOR

BY
McMorrow, Berman & Davidson
ATTORNEYS

March 13, 1956 O. G. DOUGLAS 2,738,048
VARIABLE SPEED CONTROL HYDRAULIC CLUTCH OR COUPLING
Filed Dec. 14, 1954 4 Sheets-Sheet 3

OLLIE G. DOUGLAS
INVENTOR.

BY

McMorrow, Berman + Davidson
ATTORNEYS

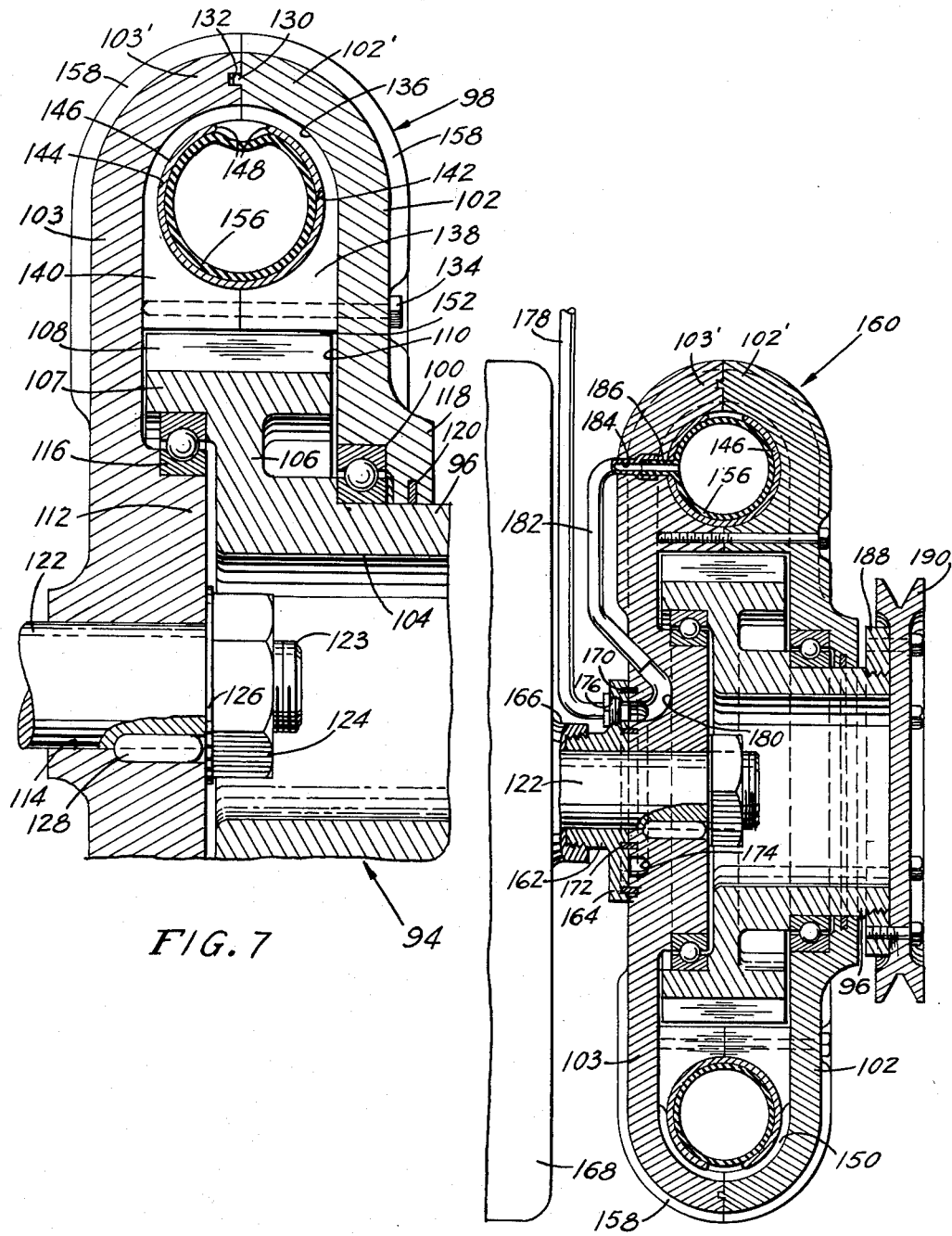

U## nited States Patent Office 2,738,048
Patented Mar. 13, 1956

2,738,048
VARIABLE SPEED CONTROL HYDRAULIC CLUTCH OR COUPLING

Ollie G. Douglas, Elizabethtown, Ky.

Application December 14, 1954, Serial No. 475,022

11 Claims. (Cl. 192—104)

This invention relates to hydraulic power transmission devices, and more particularly to hydraulic couplings or clutches. The term "clutch" may be somewhat inapt because the operation of the present device is not strictly a clutching operation, but rather a power transmitting means whereby a source of power may be operatively connected to an apparatus to be driven thereby, and particularly whereby rotation from the source of power or prime mover may be transmitted to the apparatus to be driven.

It is the principal object of this invention to provide a hydraulic clutch or coupling which may be employed on any type of machinery wherein it is required that the rotation of a driven apparatus is to be maintained at a specified constant speed regardless of variations of speed developed in the driving means or source of power transmitting rotational movement to the driven apparatus. The present invention contemplates that the clutch or coupling will be so constructed as to have the driven member rotate at the specified constant speed regardless of the variations in rotational speed of the source of power or prime mover.

The above object is attained by this invention by employing a resiliently walled, annular tube which is responsive to the flow of liquid thereagainst the increase or decrease the gas pressure within the tube so that the resistance caused by the liquid of the hydraulic coupling between the driven and driving members thereof will be correspondingly increased or decreased depending upon the speed of the driving member, whereby the driven member will be rotated at a constant speed regardless of the variation in rotational speed of the driving member. Also, the constant speed at which the driven member is to be rotated may be selectively varied by increasing or decreasing the gas pressure in the resilient tube which surrounds the driving member.

The problem of transmitting variable speed rotation to a piece of machinery or apparatus which must be driven at a constant speed has long been present, and many attempts have been made to overcome and solve this problem. The present invention solves the problem by providing a simple, yet rugged device which compensates for the variable speed of the source of power or prime mover by recognizing that the centrifugal force of the hydraulic liquid causes resistance between the driving and driven members of the coupling, but as the driving member has its rotational speed increased or decreased, this resistance between the members will be correspondingly increased or decreased by automatic operation of the resilient walled tube controlling the flow of hydraulic liquid between the driving and driven members of the coupling.

Other objects and advantages will become apparent from the following detailed description, forming the specification, and taken in conjunction with the accompanying drawings, in which:

Figure 7 is a vertical cross sectional view taken substantially along line 7—7 of Figure 6 and looking in the direction of the arrows, so that Figure 7 is a fragmentary vertical cross sectional view of Figure 6;

Figure 9 is a medial vertical cross sectional view of a still further modification, being generally similar to the structure of the form shown in Figure 6.

With continued reference to the drawings, and particularly to Figures 1 through 4, there is shown the present variable speed control hydraulic coupling or clutch, generally indicated at 10, which is of the centrifugal type. The coupling 10 comprises a rotatable driven member, generally indicated at 12, and a driving member, generally indicated at 14, which is rotatable within the member 12 about a common axis defined by a shaft 16 upon which the driving member 14 is secured, as being keyed thereto, with the shaft being journaled at one end at the central portion or center of the driven member at one side thereof and projects diametrically through the driving member at the other side thereof, with the opposite side of the driving member also affording a journal for rotatably mounting the shaft 16.

Since both the driving and driven members are generally circular, they will rotate about the common axis in concentric relation.

Figure 1:
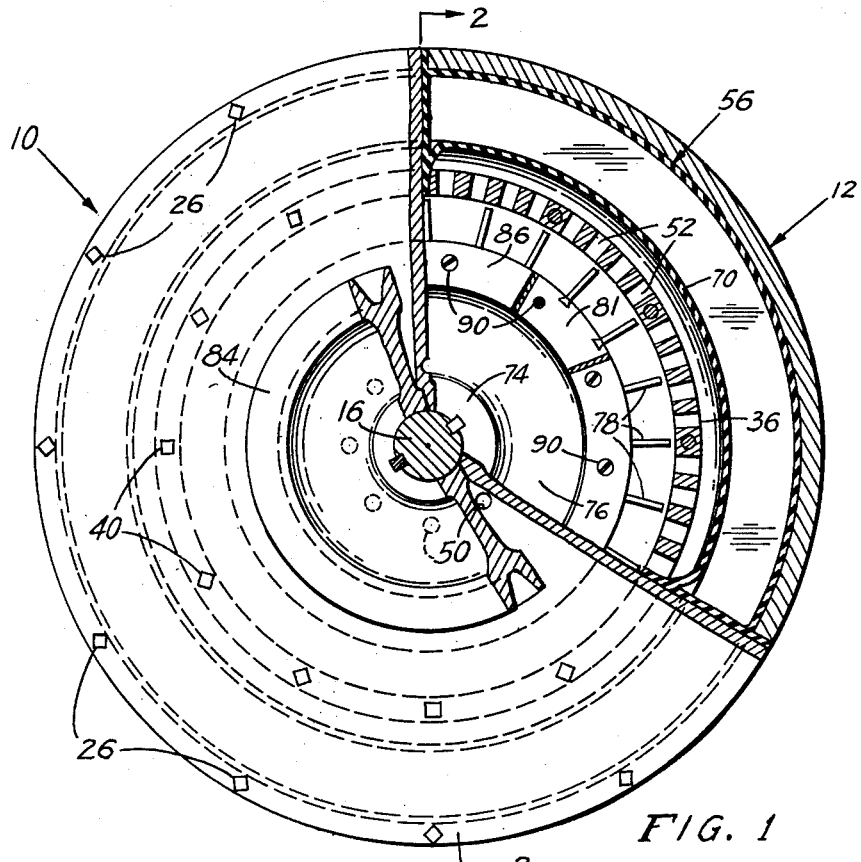
Figure 1 is a side elevational view of a hydraulic clutch or coupling embodying this invention, and being broken away in part to show internal construction.
Figure 2:
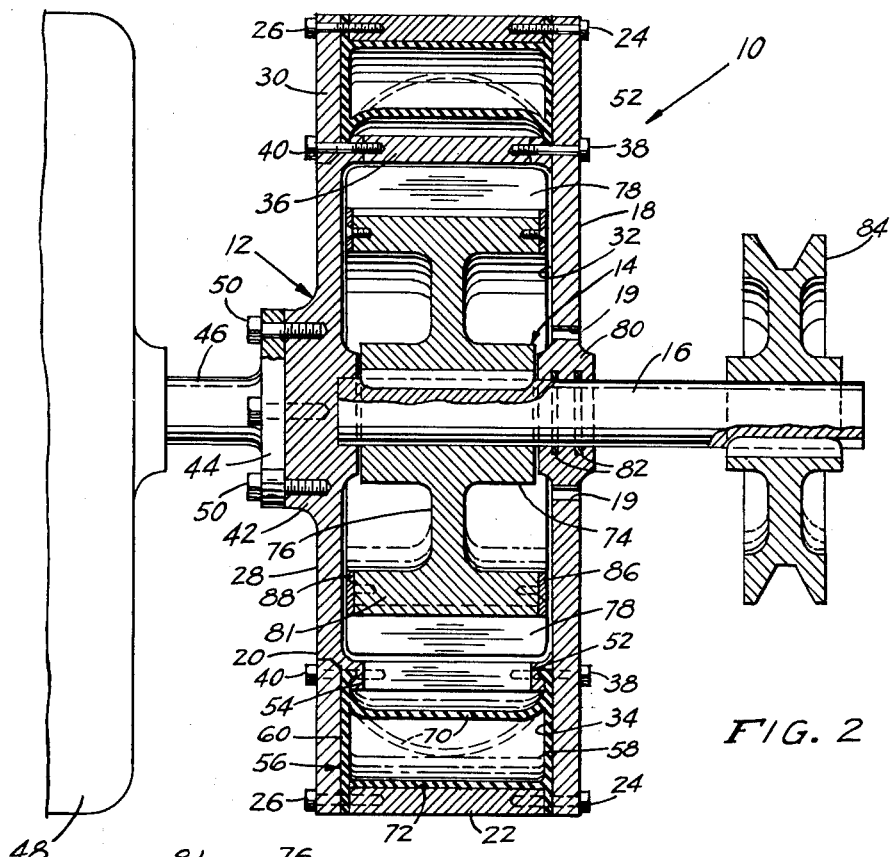
Figure 2 is a vertical, sectional view taken substantially along line 2—2 of Figure 1 and looking in the direction of the arrows.
Figure 3:
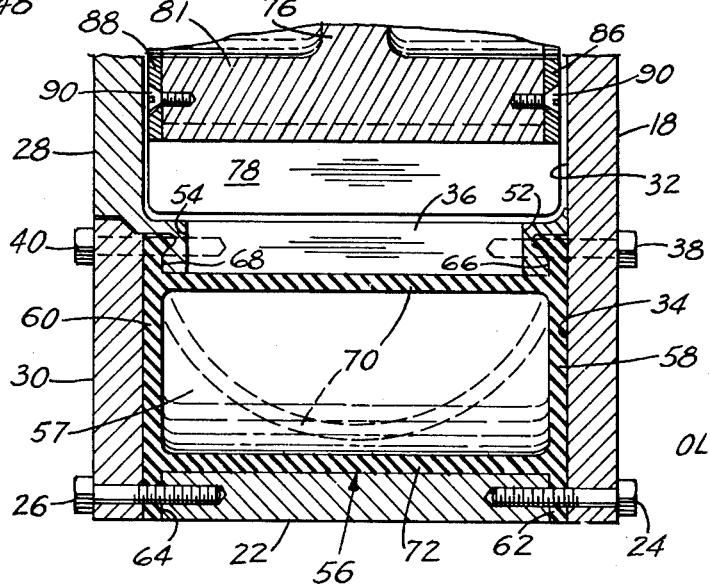
Figure 3 is a fragmentary sectional view, on a somewhat enlarged scale, of the outer portion of the coupling and corresponding generally to the lower end of the coupling shown in Figure 2.

The driven member 12 is in the form of a hollow, circular casing, and includes a front cover plate 18 made of flat metal material of suitable strength and circular in form and a circular rear cover plate 20 disposed in spaced, parallel, concentric relation to the front cover plate. An outer ring 22 is disposed between the front and rear cover plates to maintain them in their spaced relation and extends circumferentially thereabout. A plurality of mounting bolts 24 are employed to secure the front cover plate to the annular ring while a plurality of circumferentially spaced mounting bolts 26 are similarly employed to secure the rear cover plate 20 to the ring 22, as shown in Figure 2. Although the rear cover plate may be made as one piece, as shown in Figures 1 through 3, it will be seen that the rear cover plate is formed of a center or inner section 28 and a mating, coplanar outer section 30 which defines an inspection plate, as will presently appear.

The driven member 20 is thus provided with a hollow interior which is divided into a working chamber 32 and an outer accumulator chamber 34 by an annular partition wall 36 secured between the front and rear cover plates by a plurality of circumferentially spaced mounting bolts 38 and 40 respectively. The bolts 40, which secure the rear cover plate 20 and the partition wall 36 together, are also employed to secure the inner and outer sections 28 and 30 of the rear cover plate together, as clearly shown in Figure 2.

A central boss 42 is formed on the inner section 28 of the rear cover plate and extends outwardly therefrom and is adapted to have secured thereto a disc 44 carried by a shaft 46 of a unit 48 to be driven at a constant speed. The disc 44 is secured to the outer face of the boss 42 by a plurality of circumferentially spaced mounting bolts 50.

The working chamber 32 communicates with the accumulator chamber 34 through slots 52 and 54 transversely through the partition wall 36 adjacent opposite ends thereof so that hydraulic fluid or liquid may freely pass from the inner to the outer chamber.

Disposed within and extending peripherally about the accumulator chamber 34, is a tube, generally indicated at 56 made of a resilient material, such as rubber or a suitable plastic, and having its opposite side walls 58 and 60 provided with outwardly extending, outer annular flanges 62 and 64 respectively, and annular flanges 66 and 68 extending longitudinally therefrom at the other end thereof. The flanges 62 and 66 are disposed between the front cover plate 18 and the ring 22 and partition wall 36, respectively, while the flange 64 is disposed between the outer section 30 of the rear cover plate and the ring 22 with the opposite flange 68 on the side wall 60 disposed between the partition wall 36 and the juncture of the inner and outer sections of the rear cover plate, all as clearly shown in Figure 3. Thus, these flanges on the opposite side walls of the tube provide gaskets or seals against the leakage of liquid from the accumulator chamber. Extending between the side walls 58 and 60 are inner and outer end walls 70 and 72 in spaced parallel relation so as to define, in effect, a resiliently walled liner for the accumulator chamber.

It will be apparent that the tube 56 is of annular form having a hollow interior 57 into which may be pumped gas or air to a predetermined pressure, by any suitable means well known in the art.

The driving member 14 is in the form of an impeller having a hub 74 keyed upon the shaft 16 and disposed within the working chamber 32. The hub 74 has integrally formed therewith a circular vane arm 76, with the vane arm carrying on its peripheral crosshead 81 remote from the end formed on the hub 74, spaced impeller vanes 78 extending transversely across the working chamber 32.

The shaft 16 may be considered as the impeller shaft and extends through a boss 80, which is in axial alignment with the boss 42, on the front cover plate 18. The boss 80 has an opening therethrough to accommodate the shaft 16 and to provide a bearing surface therefor. Also, extending about the shaft 16 and secured in the boss 80, there is provided a pair of seal rings 82 to prevent leakage of the hydraulic liquid along the shaft.

A pulley wheel 84 is keyed to the shaft 16 at a location thereon remote from the coupling 10 and adapted for connection by means of a drive belt to a source of power or prime mover so as to have the rotation of the prime mover or source of power imparted to the shaft 16 and hence to the impeller which defines the driving member 14.

It should be noted, and as clearly shown in Figure 3, that wear rings 86 and 88 are secured upon opposite sides of the crosshead 81 so as to extend circumferentially thereabout and secured to the vanes by means of screws 90. The wear rings 86 and 88 lend rigidity to the impeller vanes 78 as well as providing a protective end covering for the opposite end faces of the crosshead.

A partition wall 36 defines, in effect, a housing for the impeller which is rotatable therewithin concentrically thereto.

In operation, as the driving member or impeller gains speed, the resistance caused by the hydraulic liquid in the working chamber between the partition wall or impeller housing 36 and the impeller tends to turn the partition wall or impeller housing, and hence the driven member 12 at the same speed so that this rotation may be imparted to the driven unit 48. Since the hydraulic liquid will flow into the accumulator chamber due to centrifugal force when the required speed is reached, the resistance will be decreased between the housing and impeller and so keeping the housing and the driven member rotating at a constant number of revolutions per minute. As the rotational power input slows down, due to speed variance in the source of power, the gas pressure in the tube 56 overcomes the lessening centrifugal force to force hydraulic liquid back into the working chamber to create more resistance between the impeller and impeller housing or partition wall to maintain the rotational speed of the driven unit 12 constant.

It will be noted, that as the hydraulic fluid is forced through the openings or slots 52 and 54 into the accumulator chamber 34, the resilient inner end wall 70 of the resiliently walled tube 56 will be forced inwardly, as shown in broken lines in Figures 2 and 3, to compress the gas therein so that the end wall 70 will force the hydraulic fluid back through the slots or openings 52 and 54 as the centrifugal force on the hydraulic liquid is lessened due to variation in the speed at which the driving member is rotated. Conversely, where the speed of the driving member is greater than the constant speed desired, the end wall 70 will be further forced inwardly so as to accommodate a greater volume of hydraulic liquid therein to thereby maintain the rotation of the driven member constant by maintaining the resistance between the impeller and the impeller housing or partition wall constant.

It will be appreciated, that the desired constant speed may be regulated by the pressure of the gas contained within the interior 57 of the tube.

Figures 4, 5:
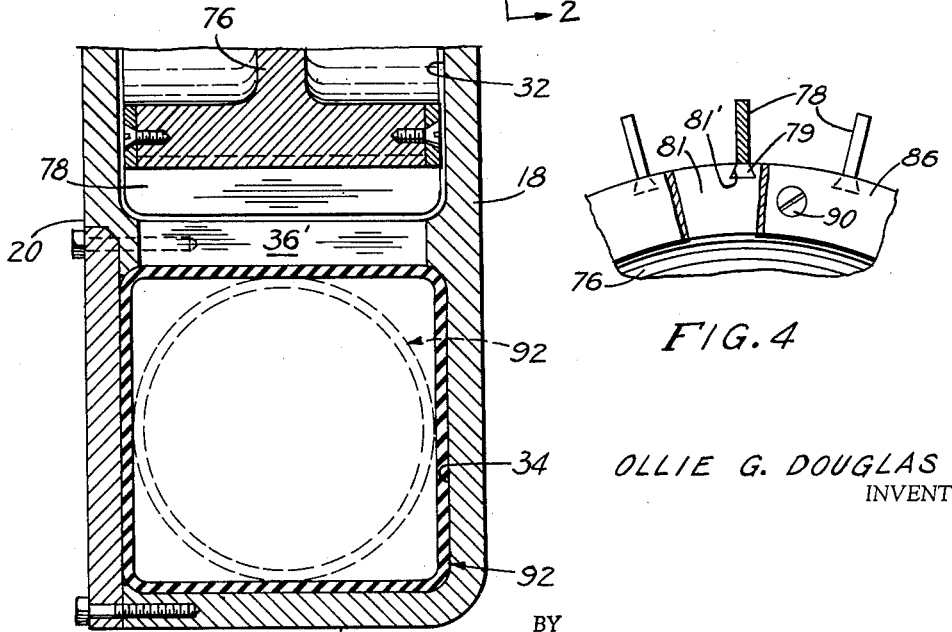
Figure 4 is a fragmentary elevational view, partially in cross section of a structural detail of the coupling.
Figure 5 is a cross sectional view similar to Figure 3, but showing a modified construction.

The form of the invention shown in Figure 5, is of similar construction to that of Figures 1 through 4, the only change being in the form of the resiliently walled tube, generally indicated at 92. This inner tube 92 is disposed in the accumulator chamber and is normally of circular cross section, as shown in broken lines, but when inflated it conforms to the shape of the accumulator chamber 34, as shown in full lines. When hydraulic liquid is forced by the impeller into the accumulator chamber, the tube will assume its original shape, and upon expansion will again conform to the shape of the accumulator chamber, so that a flow of hydraulic liquid may be maintained between the working and accumulator chambers so as to keep the driven member rotating at a constant speed despite variations in the speed at which the driving member is rotated.

Also, in Figure 5, the ring 22', corresponding to the ring 22, is made integral with the front cover plate 18 to thereby eliminate the need for the mounting bolts 24. Also, the impeller housing or partition wall 36' may be formed integrally with the front cover plate 18 to thereby eliminate the use of the mounting bolts 38.

Figure 6:
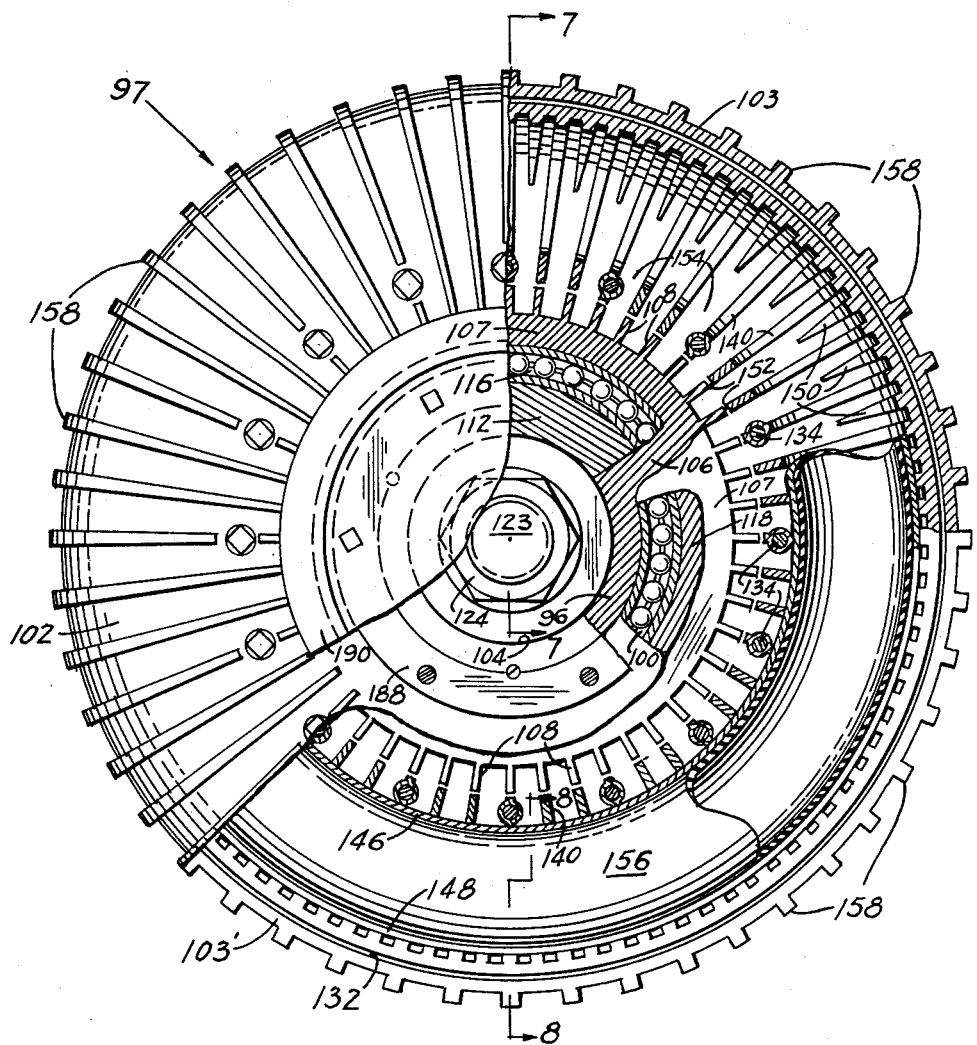
Figure 6 is a side elevational view, similar to Figure 1, but showing a somewhat modified construction of the coupling, with portions thereof being broken away to show internal construction.
Figure 8:
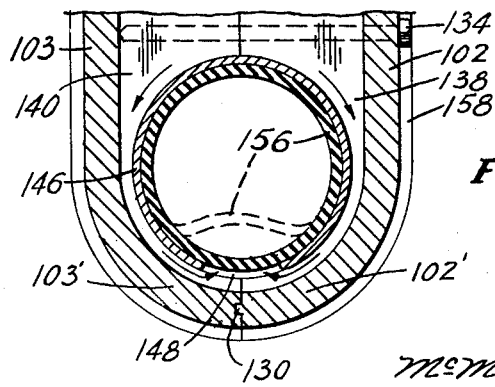
Figure 8 is a cross sectional view taken substantially along line 8—8 of Figure 6, and shown on a somewhat enlarged scale.

The same inventive principle and concept of Figures 1 through 5 is carried out in the clutch or coupling structure shown in Figures 6, 7 and 8 wherein the driving member, generally indicated at 94 comprises an impeller shaft 96 rotatably journaled along the transverse center line through a driven member, generally indicated at 98 by an antifriction bearing 100 carried by one casing section 102 constituting one-half of the casing of the driven member. An impeller shaft 96 is adapted to be operatively connected to a source of power or prime mover (not shown) so as to have rotation imparted thereto. A shaft 96 may be solid, or may be hollow, as presently shown having a central bore 104 longitudinally therethrough for a purpose described later.

A circular vane arm 106 is integrally formed with the impeller shaft 96 adjacent one end thereof disposed within the hollow interior of the casing of the driven member and is provided with a crosshead 107 which carries as integrally formed portions thereof spaced vanes 108 which will extend transversely across the working chamber 110 of the driven member defined between the casing section halves 102 and 103. An inwardly projecting boss 112 is formed concentrically about a transverse opening 114 through the casing section 103 axially aligned with the shaft 96. The boss 112 carries thereon an antifriction bearing 116 disposed between the circumference of the boss and the adjacent lower transverse edge of the vanes 108. Thus, the vane arm 106 and the vanes 108 define an impeller rotatably disposed within the inner annular working chamber 110 for rotation about an axis defined by the center line of the shaft 96.

The shaft 96 extends through an opening 118 transversely through and outwardly extending boss 118 centrally formed on the casing section 102 in concentric relation about the axis of the shaft 96. A seal ring 120 is carried in a suitably formed recess in the boss 118 so as to engagingly encircle the outer periphery of the shaft 96 to prevent oil from escaping along the shaft.

The entire speed control clutch or coupling, generally indicated at 97, is secured onto the shaft 122 of a unit (not shown) similar to the unit 48, to be driven through the coupling 97. The coupling is secured upon the driven unit shaft 122 by a nut 124 threadingly engaged upon the reduced threaded end 123 of the shaft 122 and has a washer 126 interposed between the nut 124 and the greater diameter of the shaft 122 which is journaled in the opening 114 so that the washer and nut bear against the shoulder defined between the larger and reduced diameter portions of the shaft. It will be noted that the nut is disposed within the bore 104 of the impeller shaft 96 to enable ready access thereto with a proper tool to unthread the nut from its threaded engagement upon the end 123 of the shaft 122. In addition, the casing section 103 is keyed to the shaft 122 as at 128.

As hereinbefore indicated, the coupling 97 comprises the dished section casing halves 102 and 103 which have mating, arcuate peripheral flanges 102' and 103' extending toward each other. The flange 102' has an outwardly extending annular tongue 130 which is received in a mating annular recess 132 formed in the end face of the flange 103' so that the dished casing section halves may be brought into interengaged mating relation, and secured in this relation by a plurality of circumferentially spaced mounting bolts 134.

The outer end of the hollow interior of the driven unit 97 defines an accumulator chamber 136 having inner surfaces of the mating arcuate flanges 102' and 103' defining the end walls thereof.

The sections 102 and 103 have spaced, radially extending ribs 138 and 140 extending inwardly from the arcuate end wall of the accumulator chamber and disposed transversely thereacross in coplanar relation to each other. The ribs are preferably cast integrally with the respective casing sections. The mating, coplanar ribs 138 and 140 each define blades and are provided with mating semicircular openings 142 and 144 transversely therethough to define a circular opening in which is disposed a rim 146 in the form of a tore having a hollow interior and a circumferential slot 148 transversely therethrough.

The casing sections 102 and 103 also carry circumferentially spaced ribs 150 extending inwardly from the arcuate outer wall of the accumulator chamber and individually disposed in the spaces between the blades defined by the ribs 138 and 140. In a manner similar to the ribs 138 and 140, the ribs 150 on the respective casing sections are disposed in coplanar relation transversely of the accumulator chamber and have their lower free edge arcuately formed to matingly engage about the rim 146. The ribs 150 extend only about half way around the outer radius of the chamber and are considerably shorter than the ribs 138 and 140. The ribs 150 assist in decreasing the fluid capacity of the accumulator chamber and provide additional support for the rib 146.

There is a slight clearance 152 between the blades, defined by the ribs 138 and 140, and the peripheral edges of the impeller blades or vanes 108 to thereby produce rotation of the driven member in the same direction as the direction of rotation of the impeller of the driving member during the operation of the coupling.

The ribs 138 and 140 and the ribs 150 have channel openings 154 therethrough and through which hydraulic liquid from the working chamber could flow around the periphery of the rim 146 and into and against the gas filled inner tube 156 which is of resilient material and conforms to the interior of the rim 146 so as to define a liner therefor having resilient walls.

A path of hydraulic liquid from the working chamber by action of the impeller through to the accumulator chamber and on into the rim 146 and against the inner tube 156 is shown by the arrows in Figure 8. Thus, the flow or path of the hydraulic liquid is outward and toward the periphery of the driven member 98. The peripheral slot or opening 148 not only permits the oil to flow into the rim but also provides an opening whereby the inner tube can be inserted into the rim and filled with a gas to the desired pressure.

The casing sections 102 and 103 are provided with spaced, radially extending, external cooling vanes 158 which will be disposed in mating relation to extend externally about the outer surface of the casing sections in order to assist in dissipating heat generated within the coupling. The cooling vanes or fins are placed directly opposite the ribs 138 and 140 so as to be in radial alignment therewith so as to afford the most efficient and even path of heat dissipation created by the action of the coupling.

The operation of the coupling 97 is the same in principle as that of the coupling 10, that is that the resiliently walled tube 156 will be deformed by pressure of the hydraulic fluid thereagainst up to a point determined by the pressure of the gas therewithin and will induce the flow of hydraulic fluid between the working and accumulator chambers so as to have the driving member rotated at a constant speed.

In Figure 9 there is shown, essentially the coupling of Figures 6 through 8, modified so as to accommodate means whereby the gas pressure of the inner tube 156 may be selectively varied during the operation of the coupling, generally indicated at 160. The corresponding parts of the couplings 97 and 160 will be identified by identical reference numerals except for those additional elements necessary to accommodate the means whereby the gas pressure of the inner tube may be selectively varied.

A collar 162, forming a bearing bushing for the shaft 122, is provided with an end flange 164 disposed in face-to-face relation against the outer surface of the casing section 103. The end of the collar 162 remote from the flange 164 is provided with external threading which will be engaged in internally threaded boss 166 extending axially outwardly from a unit 168 to be driven through the coupling 160. A pair of seal rings 170 and 172 are disposed in concentric relation to each other and to the axis of the shaft 122 between the flanged collar and the adjacent casing section 103, and disposed to either side of an annular chamber 174 formed in the casing section 103 in concentric relation about the shaft 122 and opening to the outer face of the casing section. An internally threaded opening 176 is provided transversely through the flange 164 at the upper end thereof so as to be in communication with the annular chamber 174. One end of a hose 178 is threadedly engaged in the opening 176 and is directed outwardly and upwardly therefrom to be attached to a source of air or gas pressure (not shown) and may be controlled through a suitable valve arrangement in the hose line 178 in a well-known manner (not shown). The passage 180 is formed in the casing section 103 having one end thereof in communication with the annular chamber 174 and the other end thereof opening to the outer face of the casing section at a location spaced outwardly from the annular chamber 174. The tube 182 has one end thereof disposed within the passage 180 entering through the end of the passage opening to the outer surface of the casing section, and extending outwardly and upwardly therefrom to enter an inlet channel 184 formed in the casing section 103 adjacent the flange 103' and extending transversely therethrough. A connector 186, of hollow tubular construction, extends between the end of the tube 182 disposed in the channel 184 and extends longitudinally therefrom through a suitably formed opening in the rim 146 and through a suitably formed opening in the inner tube 156.

Thus, the tube 182 will rotate with the driven member of the coupling while gas may be introduced or withdrawn therethrough and through the hose line 178 since the opening 176 through the collar flange 164 will be continuous communication with the annular chamber 174 permitting such introduction and withdrawal of gas from the inner tube 146.

Thus, as the coupling is rotating, the gas pressure within the inner tube 156 can be selectively varied to thereby correspondingly vary the constant speed at which the driven member of the coupling will be rotated and impart this rotation to the shaft 122 of the unit 168 to be driven.

That portion of the impeller shaft 196 at the end thereof remote from the vane blades 108 may be of reduced diameter and externally threaded to threadingly accommodate a circular attaching plate 188 thereon, to which plate a pulley wheel 190 may be bolted. The pulley wheel 190 is adapted to be driven through a suitable drive belt from a source of power or prime mover to thereby impart rotation to the driving member of the coupling.

With regard to the mounting of the impeller blades or vanes, attention is directed to Figure 4, wherein the vane arm 76 is provided with a cross head 81 extending circumferentially about the outer end of the arm 76. The cross head 81 is provided with a plurality of transversely extending dovetail slots 81' into which are slid the lower, conformably shaped, dovetail ends 79 of each of the blades or vanes 78.

Also, it will be noted that the front cover plate 18 of the driven member 12 may be provided with vents 19 extending transversely therethrough adjacent the boss 80 to relieve excess pressure created by heating of the hydraulic liquid when the clutch or coupling is in operation.

From the foregoing, it will be apparent that there has been provided a hydraulic coupling or clutch which comprises a rotatable driven member and a driving member rotatable within said driven member about a common axis, said driven member having an inner annular working chamber containing a hydraulic fluid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed. The driven member comprises an impeller which includes a shaft lying along the common axis and operatively connected to a source of power imparting rotation to the shaft and to the impeller. Also, the driven member comprises a hollow casing in which the inner working chamber and outer accumulator chamber are formed.

Specifically, with reference to the form of the invention shown in Figures 1 through 4, the driven member comprises a casing secured to a unit to be driven by operation of the coupling, with the casing including a pair of spaced circular front and rear cover plates and a ring connected to and extending between the plates adjacent their outer peripheries. The tube is provided with a pair of circumferential flanges extending outwardly therefrom at opposite sides thereof and disposed between the cover plates and the ring to define gaskets or seals. Further, there is provided an annular partition wall dividing the casing interior into the working and accumulator chambers with the wall being carried by and extending between the cover plates in slightly spaced relation to the outer periphery of the impeller to define a housing for the impeller with a clearance therebetween, the wall having slots therethrough defining passages through which the hydraulic fluid passes from the working to the accumulator chamber. One of the cover plates, the rear plate, having an inner section concentrically disposed about the axis of rotation forming one wall of the working chamber and an outer section removably carried by the inner section in mating concentric relation thereto to form one wall of the accumulator chamber and define an inspection cover for the accumulator chamber.

With respect to the form of the invention shown in Figures 6 to 8, it will be noted that the driven member comprises a hollow casing having a plurality of ribs extending radially inwardly therefrom into the accumulator chamber and extending across the accumulator chamber to define blades, a rim formed as a tore is carried by the blades and has a hollow interior which communicates with the accumulator chamber and the resilient tube being disposed within the rim. The casing also carries a second plurality of ribs with one of the plurality of ribs disposed in the space between the adjacent ones thereof in spaced parallel relation thereto and partially embracing the rim so as to provide additional support therefor.

In the modified form of the invention shown in Figure 9, there is provided in addition to the structure of Figures 6 through 8, means for increasing and decreasing the pressure of the gas in the inner tube while the coupling is in operation.

While there is shown and described the preferred embodiment of the invention, it is to be understood that the structure is susceptible to change and modification within the practicability of the invention and therefore should be limited only by the scope of the claims appended hereto.

What is claimed is:

1. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed.

2. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising an impeller including a shaft lying along said common axis and operatively connected to a source of power imparting rotation to said shaft.

3. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising a casing secured to a unit to be driven by operation of the coupling, said casing including a pair of spaced circular cover plates and a ring connected to and extending between said plates adjacent their outer peripheries.

4. A hydraulic coupling comprising a rotatable driven member, and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising a casing secured to a unit to be driven by operation of the coupling, said casing including a pair of spaced circular cover plates and a ring connected to and extending between said plates adjacent their outer peripheries, said tube having a pair of circumferential flanges extending outwardly therefrom at opposite sides thereof and disposed between said cover plates and said ring to define seals.

5. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising an impeller including a shaft lying along said common axis and operatively connected to a source of power imparting rotation to said shaft, said driven member comprising a casing secured to a unit to be driven by operation of the coupling, said casing including a pair of spaced circular cover plates and a ring connected to and extending between said plates adjacent their outer peripheries.

6. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising an impeller including a shaft lying along said common axis and operatively connected to a source of power imparting rotation to said shaft, said driven member comprising a casing secured to a unit to be driven by operation of the coupling, said casing including a pair of spaced circular cover plates and a ring connected to and extending between said plates adjacent their outer peripheries, an annular partition wall dividing the casing interior into said working and accumulator chamber, said wall carried by and extending between said cover plates in slightly spaced relation to the impeller to define a housing therefor with a clearance therebetween, said wall having slots therethrough defining passages through which the hydraulic fluid passes from said working chamber to said accumulator chamber.

7. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising a casing secured to a unit to be driven by operation of the coupling, said casing including a pair of spaced circular cover plates and a ring connected to and extending between said plates adjacent their outer peripheries, one of said cover plates having an inner section concentrically disposed about said axis forming one wall of the working chamber and an outer section removably carried by said inner section in mating concentric relation thereto forming one wall of the accumulator chamber defining an inspection cover therefor.

8. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising an impeller including a shaft lying along said common axis and operatively connected to a source of power imparting rotation to said shaft, said driven member comprising a hollow casing in which the inner working chamber and outer accumulator chamber are formed.

9. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising a hollow casing having a plurality of spaced ribs extending radially inwardly therefrom into the accumulator chamber and extending thereacross to define blades, a rim formed as a bore carried by said blades and having a hollow interior communicating with said accumulator chamber, said tube disposed within said rim.

10. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, said driven member comprising a hollow casing having a plurality of spaced ribs extending radially inwardly therefrom into the accumulator chamber and extending thereacross to define blades, a rim formed as a tore carried by said blades, and having a hollow interior communicating with said accumulator chamber, said tube disposed within said rim.

11. A hydraulic coupling comprising a rotatable driven member and a driving member rotatable within said driven member about a common axis, said driven member having an inner annular working chamber containing a hydraulic liquid and within which said driving member is disposed and an outer annular accumulator chamber in communication with said working chamber to force the flow of liquid therebetween upon rotation of said driving member, and a tube of resilient material partially inflated with a gas disposed within said accumulator chamber deformably responsive to the pressure of the forced liquid to a point where the pressure equals the pressure of the gas within the tube to maintain said driven member rotating at a constant speed and forcing the liquid from the accumulator chamber when the rotational speed of said driven member lessens to continue to maintain the driven member rotating at the constant speed, and means for increasing and decreasing the pressure of the gas in said tube while the coupling is in operation.

References Cited in the file of this patent

UNITED STATES PATENTS

| 1,881,083 | Kiep | Oct. 4, 1932 |
| 2,002,629 | Cobb et al. | May 28, 1935 |
| 2,615,462 | Crowder | Oct. 28, 1952 |
| 2,658,594 | Brown | Nov. 10, 1953 |

FOREIGN PATENTS

| 9,943 | Great Britain | of 1902 |